United States Patent
Pierce

(12) 
(10) Patent No.: US 12,023,601 B2
(45) Date of Patent: Jul. 2, 2024

(54) CARBON DIOXIDE EXTRACTION PROCESSES, DEVICES, METHODS, AND SYSTEMS

(71) Applicant: Alden Botanica LLC, Ventura, CA (US)

(72) Inventor: John A. Pierce, Ventura, CA (US)

(73) Assignee: ALDEN BOTANICA LLC, Redondo Beach, CA (US)

( * ) Notice: Subject to any disclaimer, the term of this patent is extended or adjusted under 35 U.S.C. 154(b) by 929 days.

(21) Appl. No.: 17/014,963

(22) Filed: Sep. 8, 2020

(65) Prior Publication Data

US 2021/0069610 A1 Mar. 11, 2021

Related U.S. Application Data

(60) Provisional application No. 62/897,874, filed on Sep. 9, 2019.

(51) Int. Cl.
*B01D 11/02* (2006.01)
*B01D 5/00* (2006.01)
(Continued)

(52) U.S. Cl.
CPC ............... *B01D 11/02* (2013.01); *B01D 5/00* (2013.01); *B01D 5/0072* (2013.01); *B01D 5/0081* (2013.01); *B01D 5/009* (2013.01); *B01D 11/0203* (2013.01); *B01D 11/0265* (2013.01); *B01D 11/0288* (2013.01); *B01D 11/0296* (2013.01); *B01J 19/00* (2013.01); *C11B 1/10* (2013.01); *C11B 1/106* (2013.01); *B01D 2221/10* (2013.01)

(58) Field of Classification Search
None
See application file for complete search history.

(56) References Cited

U.S. PATENT DOCUMENTS

2003/0049810 A1\* 3/2003 Chandler ............. B01J 19/2415
435/283.1
2004/0049059 A1\* 3/2004 Mueller ................. A61K 31/35
549/390

(Continued)

FOREIGN PATENT DOCUMENTS

EP 2311475 4/2011
KR 1020010084323 9/2001

OTHER PUBLICATIONS

The International Searching Authority, International Search Report, Dec. 20, 2021, 4 pages, United States.

(Continued)

*Primary Examiner* — Jennifer A Leung
(74) *Attorney, Agent, or Firm* — Kevin Schraven; Anooj Patel; Hankin Patent Law, APC

(57) ABSTRACT

A $CO_2$ extraction process for *Cannabis sativa* that uses liquid $CO_2$ in combination with co-solvent admixtures to purify *cannabis* botanicals in high yield and purity. The extraction process allows for multiple extractions, or washes, to be performed with the same solvent $CO_2$, which may be seamlessly recycled and purified between subsequent extraction cycles. A variety of in-line filtration vessels, pumps, vacuums, and controllable valves are used to yield a pure product while allowing a high level of user control over the process.

9 Claims, 11 Drawing Sheets

(51) Int. Cl.
    *B01J 19/00*     (2006.01)
    *C11B 1/10*     (2006.01)

(56) References Cited

U.S. PATENT DOCUMENTS

| | | | |
|---|---|---|---|
| 2010/0151098 A1* | 6/2010 | Catchpole | B01D 11/0292 |
| | | | 426/425 |
| 2015/0283477 A1* | 10/2015 | Chess | B01D 11/0203 |
| | | | 202/168 |
| 2016/0279535 A1 | 9/2016 | Jones | |
| 2018/0008906 A1 | 1/2018 | Kogon | |
| 2019/0153484 A1 | 5/2019 | Bray et al. | |
| 2019/0241536 A1* | 8/2019 | Durkacz | B01D 11/0203 |
| 2019/0366230 A1* | 12/2019 | Casals | B01D 15/08 |

OTHER PUBLICATIONS

The International Searching Authority, Written Opinion of the International Searching Authority, Dec. 20, 2021, 4 pages, United States.

* cited by examiner

CARBON DIOXIDE EXTRACTION PROCESSES, DEVICES, METHODS, AND SYSTEMS

CROSS-REFERENCE TO RELATED APPLICATIONS

This Application claims the benefit of U.S. Provisional Patent Application No. 62/897,874, filed on Sep. 9, 2019, titled "CARBON DIOXIDE EXTRACTION PROCESSES, DEVICES, METHODS, AND SYSTEMS," the contents of which are expressly incorporated herein by this reference as though set forth in their entirety.

FIELD OF USE

The present disclosure relates generally to the field of carbon dioxide ("$CO_2$") extraction processes, and more specifically to a $CO_2$ extraction process that uses subcritical liquid $CO_2$ in combination with solvent modifiers to extract botanicals from *Cannabis sativa* with high purity.

BACKGROUND

Extractions using organic solvents are a common way to isolate and purify natural compounds such as botanicals from raw plant matter. In the past, a variety of harsh, dangerous, or flammable solvents, such as butane, have been used for industrial extraction processes. More recently, however, liquid carbon dioxide ($CO_2$) has gained popularity as an organic solvent in extracting and isolating desirable natural compounds with high levels of purity. $CO_2$ is well-suited as an extracting solvent because it is non-toxic and non-flammable, especially when compared to other industrial organic extraction solvents.

However, prior to the present disclosure, liquid $CO_2$ extraction processes have not been used with *Cannabis sativa*. Specifically, existing processes do not use liquid, subcritical $CO_2$ to safely extract and purify medically relevant cannabis botanicals, such as cannabidiol (CBD) and tetrahydrocannabinol (THC), from raw *Cannabis sativa* plant matter. Given the recognized health benefits of *cannabis* botanicals, there is a need for a process which allows *cannabis* botanicals to be safely and effectively extracted from raw *cannabis* plant manner. Additionally, systems and methods prior to the process of the current disclosure, do not disclose the use of solvent modifiers, such as methane and ethanol in a binary mixture, as a way to enhance the extraction properties of liquid $CO_2$ when applied to *cannabis* botanicals.

Therefore, what is needed is a liquid $CO_2$ extraction process that uses subcritical liquid $CO_2$ in combination with one or more solvent modifiers to safely and effectively extract *cannabis* botanicals from raw *cannabis* plant matter, wherein the process results in very little waste byproducts and it isolates the desired *cannabis* botanicals with high levels of purity.

SUMMARY

To minimize the limitations in the cited references, and to minimize other limitations that will become apparent upon reading and understanding the present specification, the present disclose relates to carbon dioxide extraction devices, methods, and systems.

One embodiment of the extraction method of the present disclosure may be a liquid $CO_2$ extraction process comprising: (1) providing $CO_2$ in a subcritical liquid phase; (2) adding methane, usually in liquid form (in some embodiments the liquid carbon dioxide is already mixed with liquid methane), and/or ethanol, usually in liquid form (the liquid Ethanol may be introduced in a metered fashion into the stream of the liquid $CO_2$ via the use of a needle valve), as solvent modifiers to the $CO_2$ subcritical liquid phase; (3) extracting *cannabis* botanicals, such as CBD and/or THC, from raw *cannabis* plant matter, by means of the $CO_2$ subcritical liquid phase; (4) filtering away any remaining raw plant matter; (5) collecting the resulting raffinate, and; (6) recovering the liquid $CO_2$+solvent modifier phase, such that the process may be started again, recycling the previously used $CO_2$ and solvent modifier phases (and adding any new liquid carbon dioxide needed from the liquid carbon dioxide storage tank).

One embodiment of the liquid $CO_2$ extraction process may additionally comprise the steps of: sonicating with multiple ultrasonic transducers; chilling with an in-line low temperature step, so as to precipitate/congeal unwanted waxes; adsorbing with an in-line adsorbing material, to remove unwanted chlorophyll or tarry material, resulting in the safe production of high-purity *cannabis* botanicals such as CBD and THC.

One embodiment of the present disclosure may be a liquid $CO_2$ extraction apparatus, comprising one or more of:
a Liquid $CO_2$ Pump
an Intake Reservoir
one or more Extraction Vessels
a Liquid $CO_2$ Filter Vessel
one or more Product Collections Vessels
a Condenser Trap
a Gas Filter
a Cold Trap
a Heat Exchanger
a Cooler/Accumulation Reservoir
a Gas Booster $CO_2$ Pump
a Recirculating Chiller
a Recirculating Heater
one or more Liquid $CO_2$ Storage Tanks
A plurality of ultrasonic transducers
One embodiment may be a liquid $CO_2$ extraction apparatus, comprising one or more of:
a Liquid $CO_2$ Pump
wherein the Liquid $CO_2$ Pump:
may use compressed air to circulate liquid $CO_2$ through the extraction apparatus;
may have a maximum air inlet pressure of 150 PSIG;
may have a maximum $CO_2$ outlet pressure of 3000 PSIG
an Intake Reservoir
wherein the Intake Reservoir:
may be a chilled, pressurized vessel;
may have a main body that is rated to 2650 PSIG MAWP (Maximum allowable working pressure);
may have a jacket that is rated to 150 PSIG MAWP; and
may be as a cooler and accumulation reservoir for liquid $CO_2$ (prior to transferring the liquid $CO_2$ being transferred to the one or more Extraction Vessels);
one or more Extraction Vessels
a Liquid $CO_2$ Filter Vessel
one or more Product Collections Vessels
a Condenser Trap
a Gas Filter
a Cold Trap a Heat Exchanger
a Cooler/Accumulation Reservoir
a Gas Booster $CO_2$ Pump
a Recirculating Chiller
a Recirculating Heater
one or more Liquid $CO_2$ Storage Tanks One embodiment of the present disclosure may be a $CO_2$ extraction process for *cannabis* that may comprise one or more of the following: a) $CO_2$ in the liquid phase; b) adding methane, usually in liquid form (in some embodiments the liquid carbon dioxide is already mixed with liquid methane), and/or ethanol, usually in liquid form (the liquid Ethanol may be introduced in a metered fashion into the stream of the liquid $CO_2$ via the use of a needle valve), as solvent modifiers to the $CO_2$ subcritical liquid phase; c) uses ultrasonic transducers; d) use of a low temperature step "in-line" so as to precipitate/congeal unwanted waxes; and/or e) use of an adsorbent placed "in-line" to remove any unwanted chlorophyll or tarry material. The liquid $CO_2$ may be passed through the plant material (for example, *cannabis*), stripping (extracting) the substances of interest in an oil form. Then, the process may elevate the temperature of the liquid $CO_2$, which reverts the $CO_2$ to a gas. The methane remains in the $CO_2$ because the methane boiling point is much lower than that of the $CO_2$, while in the case of using the ethanol, the ethanol is deposited within the separator/collection vessel along with the purified product, leaving the finished, $CO_2$-extracted oil (sometimes in ethanol) behind for collection. The process may be kept cold using a chilled glycol-water closed loop system in order to maintain the $CO_2$ as a cold liquid.

In various embodiments of the present disclosure, the extraction process improves the efficiencies of extraction of botanicals from plant matter, and from *Cannabis Sativa* specifically. The processes of the present disclosure accomplish this by modifying the properties of the bulk solvent through the use of the solvent modifiers and, optionally, ultrasonic energy is used to further increase the efficiency of the extraction process. In some embodiments, additional filtration vessels may serve to remove unwanted tarry material. This means that the adsorbents chosen adsorb the unwanted material. This filtration aid is positioned just upstream from the collectors and after the extraction vessels) and chlorophyll by the use of an adsorbent and other additional vessels may serve to filter out unwanted precipitated/congealed waxes.

Preferably, the methane solvent modifier within the liquid carbon dioxide is at a level not to exceed 5% by weight by volume (% w/v) and any ethanol solvent modifier added to the extracting solvent stream may preferably be at a level not to exceed 5% by weight by volume (% w/v). In some embodiments, 60-Watt to 100-Watt ultrasonic transducers may be affixed to the outside of the extraction vessel itself. In some embodiments, additional filtration vessels may be added in-line to the process stream.

In some embodiments, ultrasonic transducers may be affixed to the outside of the extraction vessel while the solvent modifiers are mixed with the extracting solvent (liquid carbon dioxide).

One embodiment may be a carbon dioxide extraction apparatus, comprising: one or more extraction vessels; wherein the one or more extraction vessels are configured to receive plant-based materials (such as *Cannabis sativa*) and a carbon dioxide extraction solvent, which comprises at least carbon dioxide (usually in liquid form); wherein the carbon dioxide extraction solvent, when in a liquid phase, extracts one or more crude oil compounds (such as cannabinoids) from the plant-based materials, such that a liquid carbon dioxide and miscella mixture is created (sometimes the mixture is just referred to as a miscella); one or more filter vessels; wherein the one or more filter vessels receive from the one or more extraction vessels the liquid carbon dioxide and miscella mixture; wherein the one or more filter vessels comprise one or more adsorbent materials (in some embodiments the adsorbents may be absorbents); wherein the liquid carbon dioxide and miscella mixtures pass through the one or more adsorbent materials; one or more collection vessels; wherein the one or more collection vessels are configured to heat said liquid carbon dioxide miscella mixture, such that liquid carbon dioxide miscella mixture is separated into a used gaseous carbon dioxide and a purified oil product. Any ethanol in the extraction solvent, which remains a liquid even when heated, is preferably removed as a liquid with the purified oil product. Preferably the used gaseous carbon dioxide is captured and recycled. The carbon dioxide extraction solvent may further comprise one or more co-solvents that are usually selected from the group of co-solvents consisting of: methane; ethanol; and combinations thereof. Preferably, the one or more extraction vessels further comprises one or more ultrasonic transducers. The one or more extraction vessels are preferably less than 10 degrees Celsius and greater than 1000 PSIG. The one or more filter vessels are preferably less than 5 degrees Celsius. The one or more collection vessels are heated to approximately 45 to 90 degrees Celsius. The apparatus may further comprise: one or more condenser traps, which may be configured to separate one or more residual materials from the gaseous carbon dioxide that is received from the one or more condenser traps by selectively condensing the one or more residual materials; one or more gas filters, which may be configured to remove one or more particulate impurities from the used gaseous carbon dioxide; one or more cold traps, which may be configured to condense the used gaseous carbon dioxide back into a recaptured liquid carbon dioxide; and one or more liquid carbon dioxide recovery vessels, which are configured to store the recaptured liquid carbon dioxide. Preferably, any methane in the extraction solvent stays with the carbon dioxide and it matches phases with the carbon dioxide. The apparatus may further comprise one or more carbon dioxide gas pumps and one or more carbon dioxide storage tanks. Preferably there are two recovery tanks, sometimes called accumulators, that may store the liquid carbon dioxide that is not immediately reused in the closed loop system. Preferably, one of the accumulators is high pressure (greater than 1000 PSIG) and high temperatures (approximately 45 to 90 degrees Celsius.) and the other is low pressure (less than 600 PSIG) and low temperature (approximately 0 degrees Celsius). These accumulators are how the system stores and introduces liquid carbon dioxide into the system. The recaptured liquid carbon dioxide and a carbon dioxide in the one or more carbon dioxide storage tanks are used in the carbon dioxide extraction solvent. The apparatus may further comprise one or more co-solvent reservoirs, which are configured to store the one or more co-solvents before they are added to the extraction solvent. The apparatus may further comprise, for purposes of adding in said one or more co-solvents, a heat exchanger, a first reservoir, and a second reservoir; wherein the heat exchanger and the first reservoir may be configured to receive carbon dioxide from at least one of the one or more recovery vessels and the one or more carbon dioxide storage tanks and create a pre-co-solvent liquid carbon dioxide; wherein at least one of the one or more co-solvents are added to the pre-co-solvent liquid carbon dioxide resulting in the carbon dioxide extraction solvent; wherein the carbon dioxide extraction solvent may be stored in the second reservoir before it is transferred to the one or more extraction vessels. Preferably, the one or more co-solvents are methane, which is less than 5 percent by weight by volume, and ethanol, which is less than 5 percent by weight by volume.

Another embodiment may be a carbon dioxide extraction apparatus for extracting cannabinoids from *Cannabis sativa*, comprising: one or more extraction vessels; one or more filter vessels; and one or more collection vessels; wherein the one or more extraction vessels are configured to receive *Cannabis sativa* and a carbon dioxide extraction solvent, which comprises carbon dioxide and one or more co-solvents; wherein the carbon dioxide extraction solvent, when in a liquid phase and mixed with the *Cannabis sativa* within the one or more extraction vessels, extracts one or more crude oil compounds from the *Cannabis sativa*, such that a miscella is created that comprises the carbon dioxide extraction solvent and the one or more crude oil compounds; wherein the one or more crude oil compounds comprises one or more cannabinoids; wherein the one or more filter vessels receive from the one or more extraction vessels the miscella; wherein the one or more filter vessels comprise one or more adsorbent materials; wherein the miscella passes through the one or more adsorbent materials and is collected in the one or more collection vessels, such that one or more impurities are removed from the one or more crude oil compounds; wherein the one or more collection vessels are configured to heat the filtered miscella, such that the miscella is separated into a used gaseous carbon dioxide and a purified oil product; and wherein the used gaseous carbon dioxide is captured and recycled. The one or more co-solvents may be selected from the group of co-solvents consisting of: methane; ethanol; and combinations thereof. The one or more extraction vessels may further comprise one or more ultrasonic transducers, which are located on an exterior of the one or more extraction vessels. Preferably the one or more extraction vessels are less than 10 degrees Celsius and greater than 1000 PSIG. The one or more filter vessels are preferably less than 5 degrees Celsius. Preferably, the one or more collection vessels are heated to approximately 45 to 90 degrees Celsius. The apparatus may further comprise one or more condenser traps, which may be configured to separate one or more residual materials from the gaseous carbon dioxide that is received from the one or more condenser traps by selectively condensing the one or more residual materials; one or more gas filters, which may be configured to remove one or more particulate impurities from the used gaseous carbon dioxide; one or more cold traps, which may be configured to condense the used gaseous carbon dioxide back into a recaptured liquid carbon dioxide; and one or more liquid carbon dioxide recovery vessels, which may be configured to store the recaptured liquid carbon dioxide. The apparatus may further comprise one or more carbon dioxide gas pumps and heat exchangers that are configured to convert any carbon dioxide gas to a liquid. The device may also include accumulator tanks that store the liquid carbon dioxide when it is not put immediately back into the extraction process. The apparatus may also include a system for introducing the co-solvents into the extraction solvent. This may comprise one or more co-solvent reservoirs, which are configured to store the one or more co-solvents before they are added to the carbon dioxide extraction solvent; a heat exchanger; a first reservoir; and a second reservoir; wherein the heat exchanger and the first reservoir are configured to receive carbon dioxide from at least one of the one or more recovery vessels and the one or more carbon dioxide storage tanks and create a pre-co-solvent liquid carbon dioxide; wherein at least one of the one or more co-solvents are added to the pre-co-solvent liquid carbon dioxide resulting in the carbon dioxide solvent; and wherein the carbon dioxide solvent is stored in the second reservoir before it is transferred to the one or more extraction vessels. The one or more co-solvents may be methane, which is less than 5 percent by weight by volume, and ethanol, which is less than 5 percent by weight by volume.

Other features and advantages inherent in the disclosed in the liquid $CO_2$ extraction apparatus and processes of the present disclosure, besides those which are claimed and disclosed, will become apparent to those skilled in the art from the following detailed description and its accompanying drawings

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Figure 1:
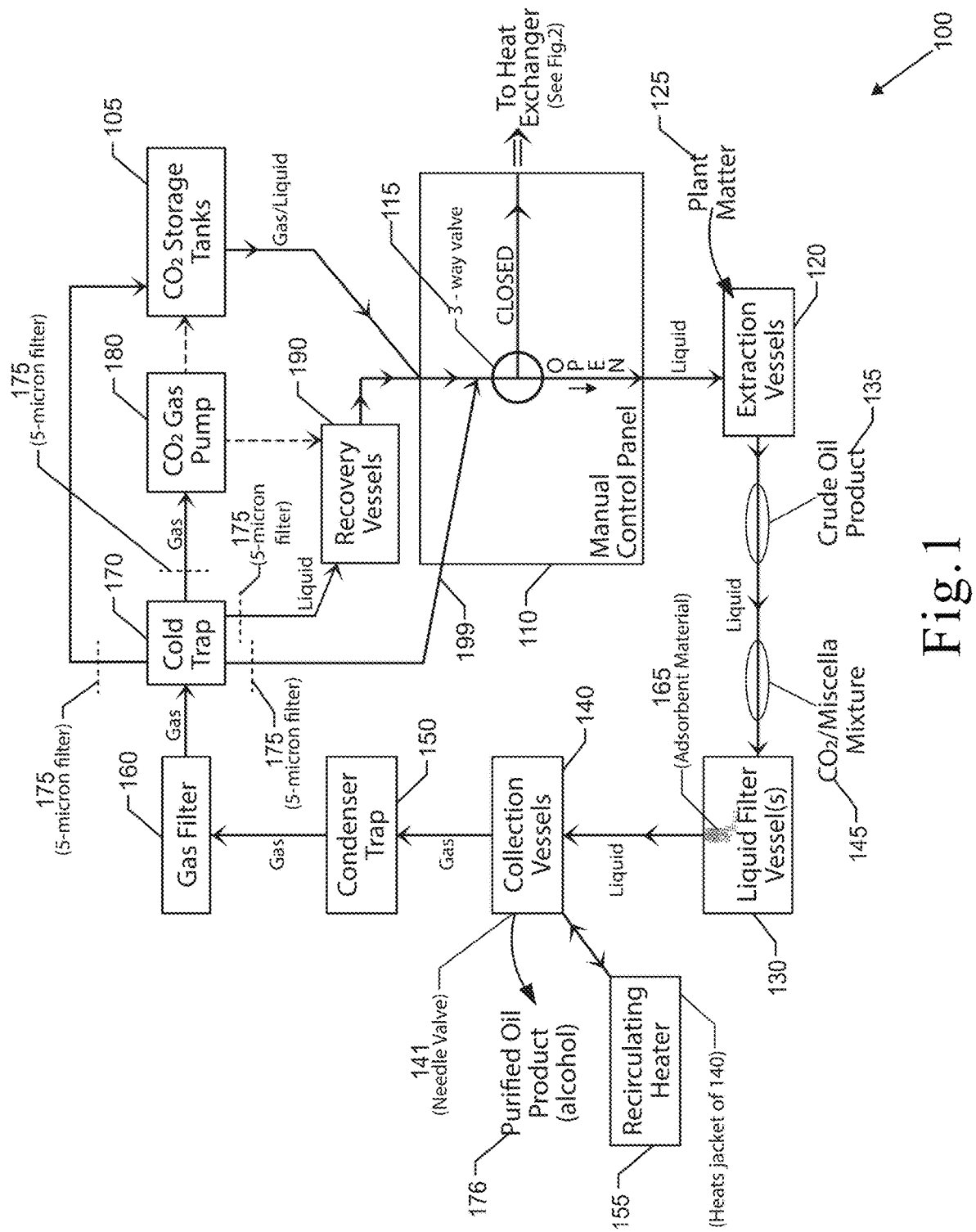
FIG. 1 is a block diagram showing one embodiment of the $CO_2$ extraction portion of one embodiment of a $CO_2$ co-solvent extraction apparatus.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about," may refer to a deviance of between 0.0001-10% from the indicated number or range of numbers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments. It is to be understood that the methods and systems are not limited to specific methods, specific components, or to particular implementations. It is also to be understood that the terminology used herein is for the purpose of describing particular embodiments only and is not intended to be limiting.

In the following description, certain terminology is used to describe certain features of one or more embodiments. For purposes of the specification, unless otherwise specified, the term "$CO_2$ extraction process" generally refers to a process that uses liquid $CO_2$ to extract botanicals from *Cannabis sativa*.

Embodiments of the present disclosure generally relate to the field of carbon dioxide ("$CO_2$") extraction processes, devices, systems, and methods. More specifically, the present disclosure relates to subcritical liquid $CO_2$ extraction wherein liquid $CO_2$ is utilized in a cold liquid state.

Figure 6:
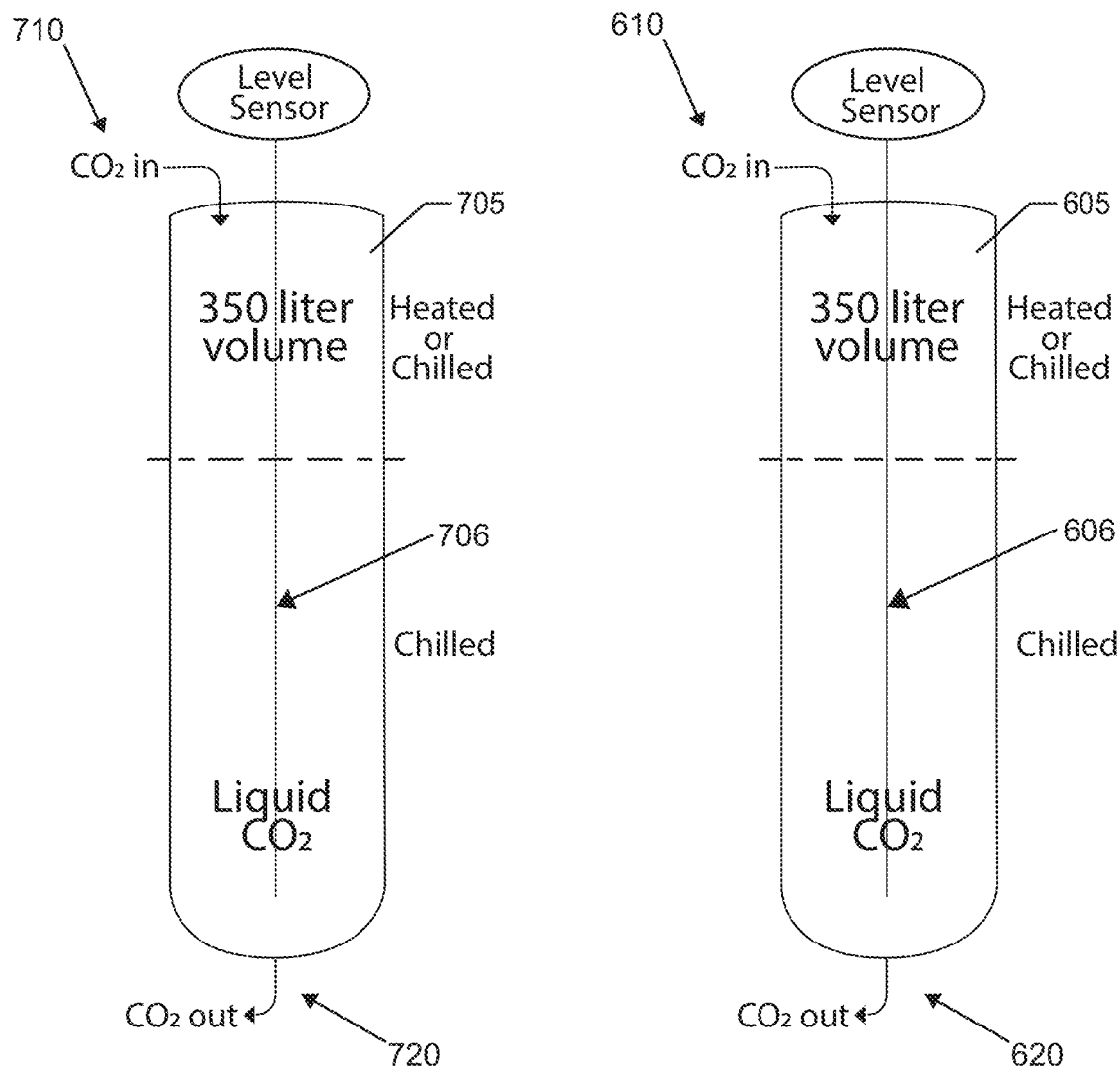
FIG. 6 is an illustration of one embodiment of the accumulator vessels.

FIG. 1 is a block diagram showing one embodiment of the $CO_2$ extraction portion of one embodiment of a $CO_2$ co-solvent extraction apparatus. As shown in FIG. 1, the liquid $CO_2$ extraction apparatus 100 may include, but is not limited to, $CO_2$ storage tanks 105, a manual control panel 110, extraction vessels 120, liquid filter vessels 130, collection vessels 140, a condenser trap 150, gas filter 160, a cold trap 170, an approximately 5-micron filter 175, a $CO_2$ gas pump 180, and recovery vessels 190. In various embodiment, the recovery vessels would be the vessels that the $CO_2$ is pumped into. It is the collection vessel 140 where the ethanol and extracted purified product/oil would be deposited while the methane would remain within the $CO_2$ itself. The $CO_2$ storage tanks 105 may act as an initial source of $CO_2$ for the extraction apparatus 100. Preferably, a high percentage of the $CO_2$ provided by the $CO_2$ storage tanks 105 may be recycled after each extraction cycle, resulting in a highly efficient process that minimizes solvent waste. In some embodiments, the storage tanks 105 and the recovery vessels 190 are the same and there are, as shown in FIG. 6, two of them and they can be referred to as accumulator tanks.

The manual control panel may be an analog, mechanical, or digital controller that allows the user to add co-solvents to the carbon dioxide solvent. In some embodiments, the manual control panel may be automatic or programmable and can be configured to add the co-solvents at specified or pre-programmed times.

The Extraction Process

In one embodiment, $CO_2$ may be released from the $CO_2$ storage tanks 105, and flow through the extraction apparatus 100 in the following preferred sequence: to the manual control panel 110, the extraction vessels 120, the liquid filter vessels 130, the collection vessels 140, the condenser trap 150, the gas filter 160, the cold trap 170, the $CO_2$ gas pump 180, and the recovery vessels 190. Once the solvent $CO_2$ has reached the recovery vessels 190, the cycle may be terminated, or it may continue for additional iterations. If the cycle is continued, $CO_2$ may be pumped through the recovery vessels 190, via the $CO_2$ gas pump 180, back to the manual control panel 110, where the cycle may begin again.

The $CO_2$ Storage Tanks 105

The $CO_2$ storage tanks 105 may provide the initial source of $CO_2$ for the extraction apparatus 100. $CO_2$ may be siphoned from the $CO_2$ storage tanks 105 to the manual control panel 110 and subsequently to the extraction vessels 120. The $CO_2$ storage tanks 105 are preferably U.S. Department of Transportation (DOT) approved, Compressed Gas Association (CGA) rated, pressurized gas or liquid $CO_2$ cylinders equipped with siphon tubes. In one embodiment, the $CO_2$ storage tanks 105 may be cylinders with the following properties: approximately 110 pound weight, dimensions of approximately 7.5" diameter×51" height, rated to a minimum of approximately 2000 PSIG (pounds per square inch gauge). Because $CO_2$ remains a liquid at pressures of approximately 905 PSIG or higher at a room temperature of 75° F., $CO_2$ is stored in liquid form in this embodiment. However, $CO_2$ may be stored as a gas by using lower pressure $CO_2$ storage tanks 105.

The Extraction Vessels 120

Before the extraction process begins, plant matter 125 may be added to the one or more extraction vessels 120. In some embodiments, the extraction vessels 120 may include a hinged top that opens to allow for easy loading of plant matter 125. During the extraction process, $CO_2$ flows from the manual control panel 110 to the extraction vessels 120, which have already been preloaded with plant matter 125.

The extraction vessels 120 may be chilled, glycol jacketed, ASME (American Society of Mechanical Engineers) rated pressure vessels. In some embodiments, the extraction vessels 120 may have a main body and a jacket rated to approximately 2650 and 150 PSIG MAWP (maximum allowable working pressure), respectively. Preferably, the extraction vessels 120 may be cooled to about 40° F. and be operated at 1400 PSIG. Multiple extraction vessels 120 may be connected and operated in parallel in order to maximize extraction throughput per cycle. The extraction vessels 120 may be equipped with hinged heads and bases, allowing plant matter 125 to be added or removed from the extraction vessels 120, respectively.

As the $CO_2$ (extract solvent) enters the extraction vessels 120, the reduced temperature and high pressure converts any gaseous $CO_2$ to a liquid. In some embodiments, the extraction vessels 120 may include a 100-mesh (100 openings per inch) screen near the bottom of each vessel to prevent plant matter 125 from flowing downstream to the liquid filter vessels 130.

The glycol jacketing of the extraction vessels 120 ensures that a constant uniform temperature of approximately 40° F. is maintained throughout the extraction process. As the liquid $CO_2$ passes through the extraction vessels 120, crude oil product 135 (such as CBD) is extracted from the plant matter 125, as an oil dissolved within the liquid $CO_2$. The result is a $CO_2$/miscella mixture 145, which flows from the extraction vessels 120 onto the liquid filter vessel 130.

The Liquid Filter Vessel 130

In one embodiment, the liquid filter vessel 130 may be a chilled, glycol-jacketed, ASME-rated pressure vessel, with a main body and jacket rated to approximately 2650 and 150 PSIG MAWP, respectively. The jacket of the liquid filter vessel 130 may be further cooled using a 30° F. glycol-water mixture, maintaining the cool temperature of the $CO_2$/miscella mixture 145. As the $CO_2$/miscella mixture 145 passes through the liquid filter vessel 130, any remaining particulate solids are filtered away by means of an in-line adsorbent material 165. The adsorbent material 165 may be chosen from, but is not limited to: bentonite, montmorillonite, activated charcoal, silica, silica gel, alumina, activated alumina, carbons, zeolites, polymers, resins, clay, and the like. Each adsorbent has its own unique properties that assist in removing impurities from the $CO_2$/miscella mixture 145. For example, alumina is useful for adsorbing heavy metals such as arsenic; silica adsorbs polar substances, such as the flavonoids and carboxylated forms of cannabinoids; and clay adsorbs chlorophyll and tarry material. The adsorbent material 165 may be held in place by a filter element that may be nominally 100-mesh. Preferably, the liquid filter vessel 130 is cooled via the circulating glycol in its jacket, such that the bed of the adsorbent material 165 maintains a temperature of approximately 30° F.

The Collection Vessels 140

After passing through the liquid filter vessel 130, the filtered $CO_2$/miscella mixture 145 proceeds to the collection vessels 140. In a preferred embodiment, one or more collection vessels 140 may be arranged in parallel in order to maximize efficiency and speed up the collection process. The collection vessels 140 may be hot water-jacketed, ASME-rated pressure vessels with a main body and jacket rated to approximately 2650 and 150 PSIG MAWP, respectively. The collection vessels 140 are preferably heated to approximately 175° F. (45 to 90 degrees Celsius) via circulated hot water/glycol in the jackets of the collection vessels 140. The circulated hot water may be provided by a recirculating heater 155.

Heating the collection vessels 140 causes the liquid $CO_2$ to evaporate. The methane, if any, stays within the $CO_2$ while the ethanol is deposited in the collection vessel. As a result, the $CO_2$/miscella mixture 145 separates into gaseous $CO_2$ and a purified oil product 176. This separation occurs because the physical properties of $CO_2$ are such that it cannot remain a liquid above temperature of approximately 87.9° F., at any pressure. Preferably, the collection vessels 140 are operated at a pressure of 1100 PSIG. Heat may be supplied to the collection vessels 140 by means of a closed-loop recirculating heater 155, which circulates high temperature (175° F./45 to 90 degrees Celsius) water/glycol through the jackets of the collection vessels 140. The recirculating heater 155 thus supplies the necessary heat to promote the $CO_2$ phase transition from liquid to gas.

In addition to converting the $CO_2$ from a liquid to a gas, heating the collection vessels 140 also reduces the viscosity of the purified oil product 176, making it easier to collect at the base of the collection vessels 140 via gravity. As the purified oil product 176 flows to the bottom of the collection vessels 140, a needle valve 141 may be selectively opened to drain the purified oil product 175 into food-safe containers for secure storage. The $CO_2$ inlet lines to the collection vessels 140 may be isolated periodically to allow pressure to drop on the gas outlet side of the collection vessels 140.

The $CO_2$ Solvent Recovery Process—Preparing for the Next Extraction Cycle

Once the purified oil product 175 has been collected, the evaporated $CO_2$ may preferably be purified and re-condensed into a liquid so that it may be reused for subsequent extractions. The re-condensed $CO_2$ may eventually be cycled back through to the manual control panel 110.

The Condenser Trap 150

As the purified oil product 176 is removed from the collection vessels 140 via the needle valves 155, the evaporated $CO_2$ solvent proceeds on to the condenser trap 150. The condenser trap 150 may be a chilled, glycol jacketed, ASME-rated pressure vessel with a main body and jacket rated to approximately 2650 and 150 PSIG MAWP, respectively. The main purpose of the condenser trap 150 is to separate any residual oil and water from the gaseous $CO_2$ by selectively condensing the non-$CO_2$ impurities out of the gaseous mixture. The condenser trap 150 uses a similar design as the collection vessels 140, except that it uses a cooling jacket to help condense impurities out of the gaseous $CO_2$. The reduced temperature of the condenser trap 150 causes any non-$CO_2$ impurities to condense into a liquid, which remains in the condenser trap 150, while the gaseous $CO_2$ continues on to the next stage.

The Gas Filter 160

Flowing from the condenser trap 150, the partially purified gaseous $CO_2$ now enters the gas filter 160. The gas filter 160 may be a chilled, glycol-jacketed, ASME-rated pressure vessel, with a main body and jacket rated to approximately 2650 and 150 PSIG MAWP, respectively. The gas filter 160 may be configured to function as a charcoal filter and/or molecular sieve, and may further be equipped with a bottom blow down valve for draining and removal any remaining sediment. The purpose of the gas filter 160 is to remove any stray particulate impurities from the gaseous $CO_2$, so that it may be re-condensed and recirculated through the extraction apparatus 100.

The Cold Trap 170 and $CO_2$ Gas Pump 180

Next, the purified gaseous $CO_2$, passes to the cold trap 170 to be re-condensed into a liquid. The cold trap 170 may be a chilled, glycol-jacketed, ASME-rated pressure vessel with a main body and jacket rated to approximately 2650 and 150 PSIG MAWP, respectively. The cold trap 170 condenses the purified gaseous $CO_2$ back into a liquid by cooling and applying sufficient pressure, so that it can be used for the next extraction round.

In another embodiment, the cold trap 170 stores the gaseous $CO_2$, chills it, increases the pressure and sends it to the heat exchangers and booster pumps to condense it to a liquid.

In addition, the $CO_2$ gas pump 180 is used for recovering any non-condensed, gaseous $CO_2$ out of the extraction apparatus 100 at the end of a completed extraction cycle. The $CO_2$ gas pump 180 may be fabricated by Hydraulics International (or an equivalent), and may use compressed air, regulated down to approximately 60 PSIG to compress the $CO_2$ gas for storage in the recovery vessels 190. Alternatively, the $CO_2$ gas pump 180 may compress gaseous $CO_2$ for storage in the $CO_2$ storage tanks 105. In either approach, the cold trap 170 and $CO_2$ pumps function together to recapture a very high percentage of the solvent $CO_2$ used at the beginning of the extraction process. From here, the recovered $CO_2$ may be recirculated into the manual control panel 110 at Valve 4 (see FIGS. 3a-e for more details). In some embodiments, a $CO_2$ pump may send 199 the purified $CO_2$ from the cold trap 170 back to the control panel 110 for immediate use. With an ongoing extraction, most of the recollected and purified extraction solvent is pumped in a closed loop manner through the extraction vessels 120.

Generally, there may be two output lines for the cold trap 170, one flows 199 directly to the manual control panel 110, while the other takes the more circuitous route to the control panel 110, by way of passing through the carbon dioxide gas booster pump 180 and into the accumulator/storage vessels 105, and then to the manual control panel 110. The gas pump 180 may be part of a condensing system (which may include heat exchangers) and result in liquid carbon dioxide being recovered and stored.

Subsequent Extractions—The 3-Way Valve of the Manual Control Panel

As discussed above, the solvent $CO_2$ used for extraction may be recovered in high yield by a combination of the cold trap 170 and the $CO_2$ gas pump 180. At this point, the extraction cycle may be concluded, with the recovered $CO_2$ stored for later use. However, the cycle may be continued multiple times in continuation as necessary or desired. Repeated extractions may be used, for example, to provide a second or third wash of the same batch of plant matter 125 loaded into the extraction vessels 120 in order to ensure maximum yield of the desired purified oil product 175.

As recycled $CO_2$ makes its way back to the manual control panel 110, the circulation path it takes next is dictated by the position of a 3-way valve 115 in the manual control panel 110. If the 3-way valve 115 is open, the recycled (or new) liquid $CO_2$ continues through to the extraction vessels 120, and the steps outlined hereinabove are repeated. If the 3-way valve 115 is closed, however, the $CO_2$ may flow instead to the heat exchanger 210.

Figure 2:
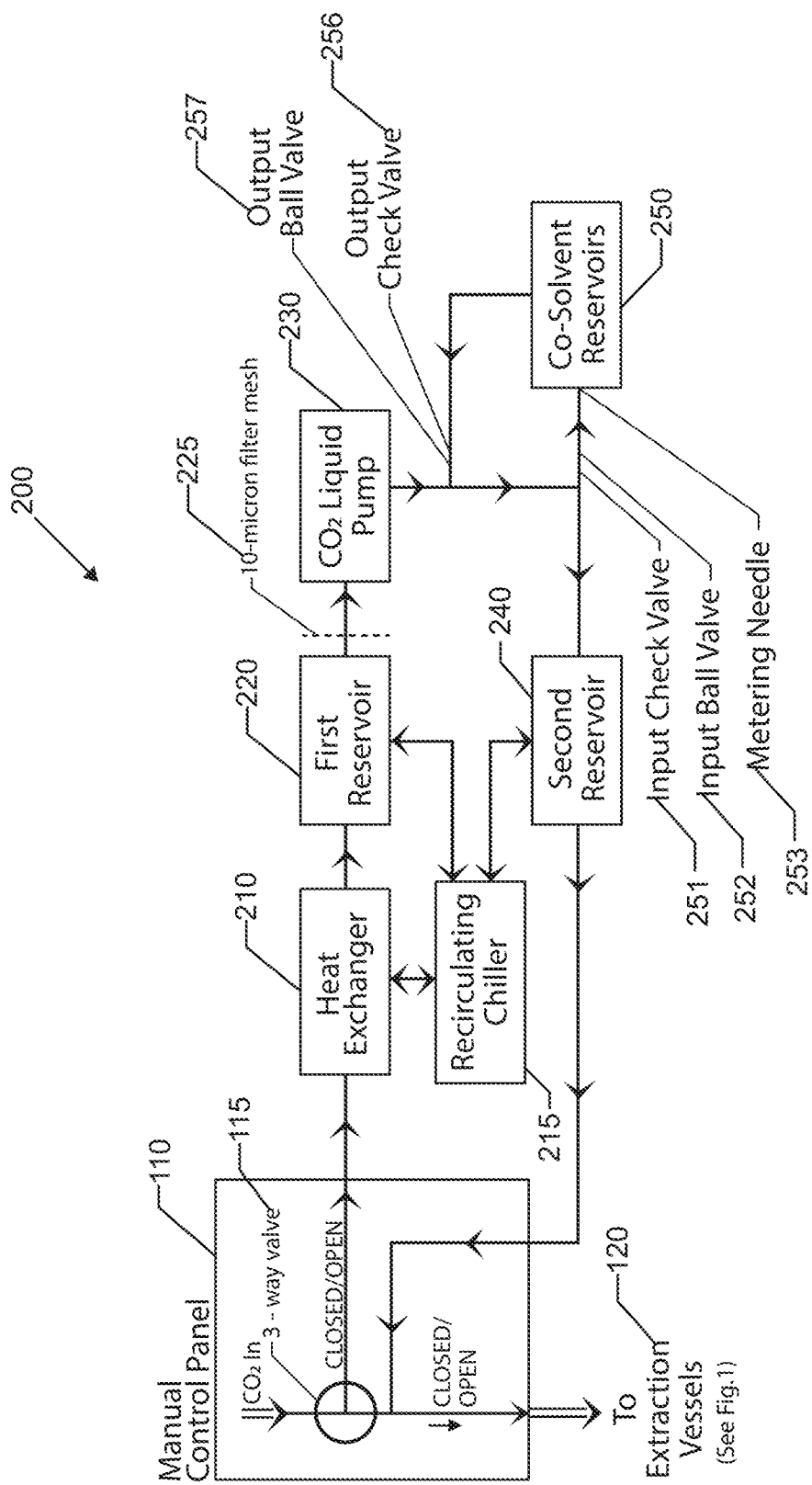
FIG. 2 is a block diagram showing a co-solvent infusion portion of one embodiment of a $CO_2$ co-solvent extraction process.

FIG. 2 is a block diagram showing a co-solvent infusion portion of one embodiment of a $CO_2$ co-solvent extraction apparatus. FIG. 2 shows the co-solvent extraction apparatus 200 and the components related to co-solvent addition. FIG. 2 details the components that may be used to add co-solvents into the primary $CO_2$ solvent at a controlled rate, without interrupting the extraction process. Liquid $CO_2$ may be sent to the co-solvent addition portion of the extraction apparatus 200 via the manual control panel 110, when the 3-way valve 115 is in the closed position. The first chamber the liquid $CO_2$ flows to from the manual control panel 110 is the heat exchanger 210.

The Heat Exchanger 210

The heat exchanger 210 may be an ASEM-rated, shell-and-tube heat exchange apparatus. The heat exchanger 210 may comprise a tube bundle and shell rated to approximately 600 and 150 PSIG MAWP, respectively (hydro tested to approximately 780 and 195 PSIG, respectively). Liquid $CO_2$ passes through the tube bundle while chilled glycol passes through the outer shell, maintaining an even temperature distribution of the $CO_2$.

The Reservoirs and the $CO_2$ Liquid Pump 230

Liquid $CO_2$ then passes from the heat exchanger 210 to a first reservoir 220. In some embodiments, the first reservoir 220 may be a chilled, glycol-jacketed, ASME-rated pressure vessel, with a main body and jacket rated to 2650 and 150 PSIG MAWP, respectively. The first reservoir 220 acts primarily as a cooler and accumulation reservoir for liquid $CO_2$ received from the heat exchanger 210 on its way to the $CO_2$ liquid pump 230. Preferably, the tubing connecting the first reservoir 220 and the $CO_2$ liquid pump 230 may be equipped with an approximately 10-micron filter mesh 225.

In one embodiment, the heat exchanger 210, the first reservoir 220, and the second reservoir 240 may all be chilled by means of a recirculating chiller 215. The recirculating chiller 215 acts as a closed-loop recirculating system that maintains a low temperature of approximately 30° F. among the heat exchanger 210, the first reservoir 220, and the second reservoir 240.

The $CO_2$ liquid pump 230 may use compressed air to circulate liquid $CO_2$ further through the extraction apparatus 200. Liquid $CO_2$ preferably enters the $CO_2$ liquid pump 230 from the first reservoir 220, preferably at a pressure and temperature of approximately 700 PSIG and 45° F., respectively; the pressure is then boosted to approximately 1400 PSIG. In one embodiment, the $CO_2$ liquid pump 230 has a maximum air inlet pressure of approximately 150 PSIG, and a $CO_2$ outlet rated to a maximum pressure of approximately 3000 PSIG. The $CO_2$ liquid pump 230 pumps liquid $CO_2$ into the second reservoir 240.

The second reservoir 240 may be a chilled, glycol-jacketed, ASME-rated pressure vessel with a main body and jacket rated to approximately 2650 and 150 PSIG MAWP, respectively. The second reservoir 240 acts primarily as a cooler and accumulation reservoir for liquid $CO_2$ prior to the $CO_2$'s eventual transfer back to the control panel 110 and/or extraction vessels 120. At this point, the liquid $CO_2$ may preferably be at a maximum of approximately 1400 PSIG and approximately 50° F., during processing, depending on the output of the $CO_2$ liquid pump 230. Liquid $CO_2$ is piped from the second reservoir 240 to the manual control panel 110, where it may then be diverted either back to the $CO_2$ storage tanks 105 or to the extraction vessels 120. Liquid $CO_2$ may be piped from the second reservoir 240 to the $CO_2$ storage tanks 105 through the 3-way valve 115 of the manual control panel 110. When the 3-way valve 115 is placed in the open position, liquid $CO_2$ may be diverted to the extraction vessels 120 with valve 5 closed and valve 1 open.

Co-Solvents—Modifying the Bulk $CO_2$ Solvent for Enhanced Extraction

As shown in FIG. 2, additional solvents, such as an ethanol or methane, may be added to the liquid $CO_2$, resulting in a mixed co-solvent mixture for plant extraction. By including a co-solvent reservoir 250 situated in parallel to the second reservoir 240, the co-solvent addition apparatus 200 allows for selective addition of co-solvent to the liquid $CO_2$ circulating in the system. Preferably, the co-solvent may be an alcohol, such as ethanol, or methane, and may be mixed into the circulating liquid $CO_2$ at approximately 0° C. Although ethanol and methane are the preferred co-solvents, other compounds may be used, such as alcohols that would be recycled as a liquid, methanol, propanol, or isopropanol, acetone, ethyl acetate, and such as hydrocarbons that would stay with the carbon dioxide, ethane, propane, butane, and the like. Because the co-solvents are in a liquid carbon dioxide stream, they do not make the extraction solvent flammable, despite being flammable themselves.

As shown in FIG. 2, the co-solvent reservoirs 250 may preferably be situated in parallel to the second reservoir 240, such that the tubing extending from the $CO_2$ liquid pump 230 forms a first "tee" in which the liquid can "turn" left or right towards the co-solvent reservoirs 250 or the second reservoir 240. An input check valve 251 is located on the tubing path which leads to the co-solvent reservoirs 250, followed by an input ball valve 252. The input check valve 251 ensures that there is no back flow of solvent, while the input ball valve 252 functions as an on/off control. Further downstream towards the co-solvent reservoirs 250 may be a metering needle valve 253, which controls (limits) the flow of liquid $CO_2$ into the co-solvent reservoirs 250. The output of the co-solvent reservoirs 250 may be directed back into the liquid $CO_2$ line which feeds into the second reservoir 240, according to the configuration shown in FIG. 2, forming a second "tee." Preceding this second "tee" may be an output check valve 256 and an output ball valve 257, which function similarly to the input check valve 251 and the input ball valve 252 used to control the flow of liquid into the co-solvent reservoirs 250.

The arrangement of the first "tee" and second "tee" may be such that the entry of the co-solvent-containing liquid $CO_2$ is orthogonal to the flow of the liquid $CO_2$ coming from the $CO_2$ liquid pump 230. In this arrangement, the two "tee" orientations provide for a high-pressure side (flowing into the co-solvent reservoirs 250) and a low-pressure side (returning co-solvent-containing liquid $CO_2$ back into the main liquid $CO_2$ stream), while the check valves and the needle metering valve 253 maintain a controlled flow. In this manner, the liquid $CO_2$ pumped out of the $CO_2$ liquid pump 230 may be mixed with co-solvents, such as alcohol or methane, in a controlled manner without the need for an external pump specific for this purpose.

Preferably, a co-solvent may be mixed in with liquid $CO_2$ until the resulting co-solvent-containing liquid $CO_2$ is approximately 5% co-solvent by mass. Multiple co-solvents, such as ethanol and methane, may be concurrently mixed in with the liquid $CO_2$ solvent, by chaining an additional co-solvent reservoirs 250, with corresponding input check valve 251, input ball valve 252, and metering needle valve 253, in parallel with the initial co-solvent reservoirs 250. The addition of co-solvents allows for quantitative extraction of any lighter terpenes and/or polar constituents present in the liquid $CO_2$.

Although FIG. 2 shows a specific embodiment of valves and reservoirs, any arraignment may be used that is configured to add additional solvents to the liquid $CO_2$ extraction solvent.

FIGS. 3A-E are illustrations showing another embodiment of the $CO_2$ extraction process of the present disclosure.

As shown in FIGS. 3A-E, liquid $CO_2$ may be seamlessly used as an extraction solvent, with or without co-solvents. The liquid $CO_2$ extraction solvent may be recaptured and put right back into the system and be used in multiple passes through the extraction vessels 320, while being supplemented with new liquid carbon dioxide, and cosolvent, if desired, without interrupting the process in order to maintain proper pressure. Should the pressure get too high, the extraction solvent may be put into accumulator vessels to lower the pressure of the continuous loop.

Figure 3A:
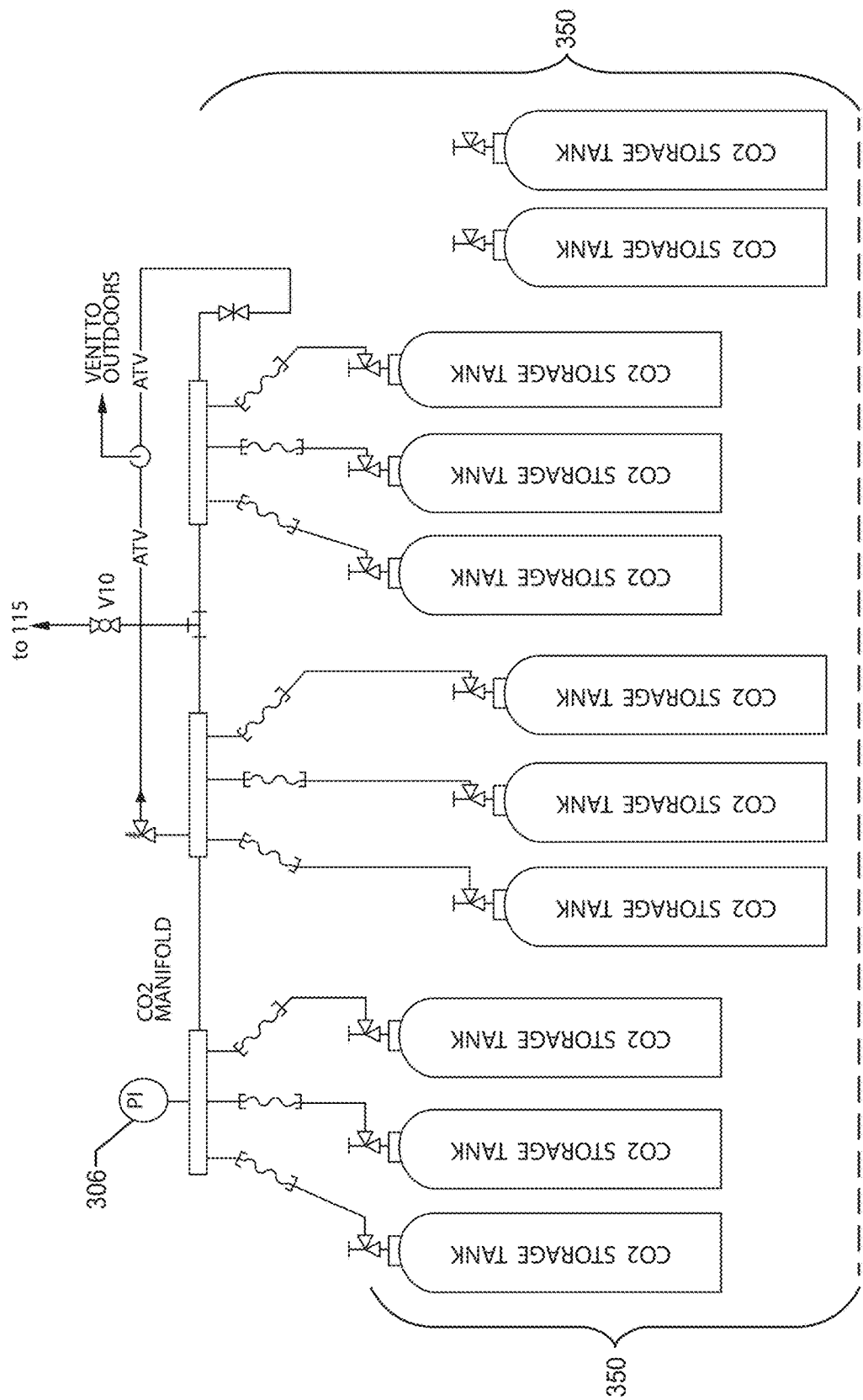
FIGS. 3A-E are illustrations showing another embodiment of the $CO_2$ extraction process of the present disclosure.

As shown in FIG. 3A, the $CO_2$ storage tanks 305 (which may also double as accumulation vessels for capturing the used liquid carbon dioxide, may be arranged in parallel, and may preferably be equipped with pressure gauges 306 for pressure monitoring. A valve V10 may be used to control the flow of $CO_2$ from the $CO_2$ storage tanks 305 to valve 115 of the manual control panel 110.

Figure 3B:
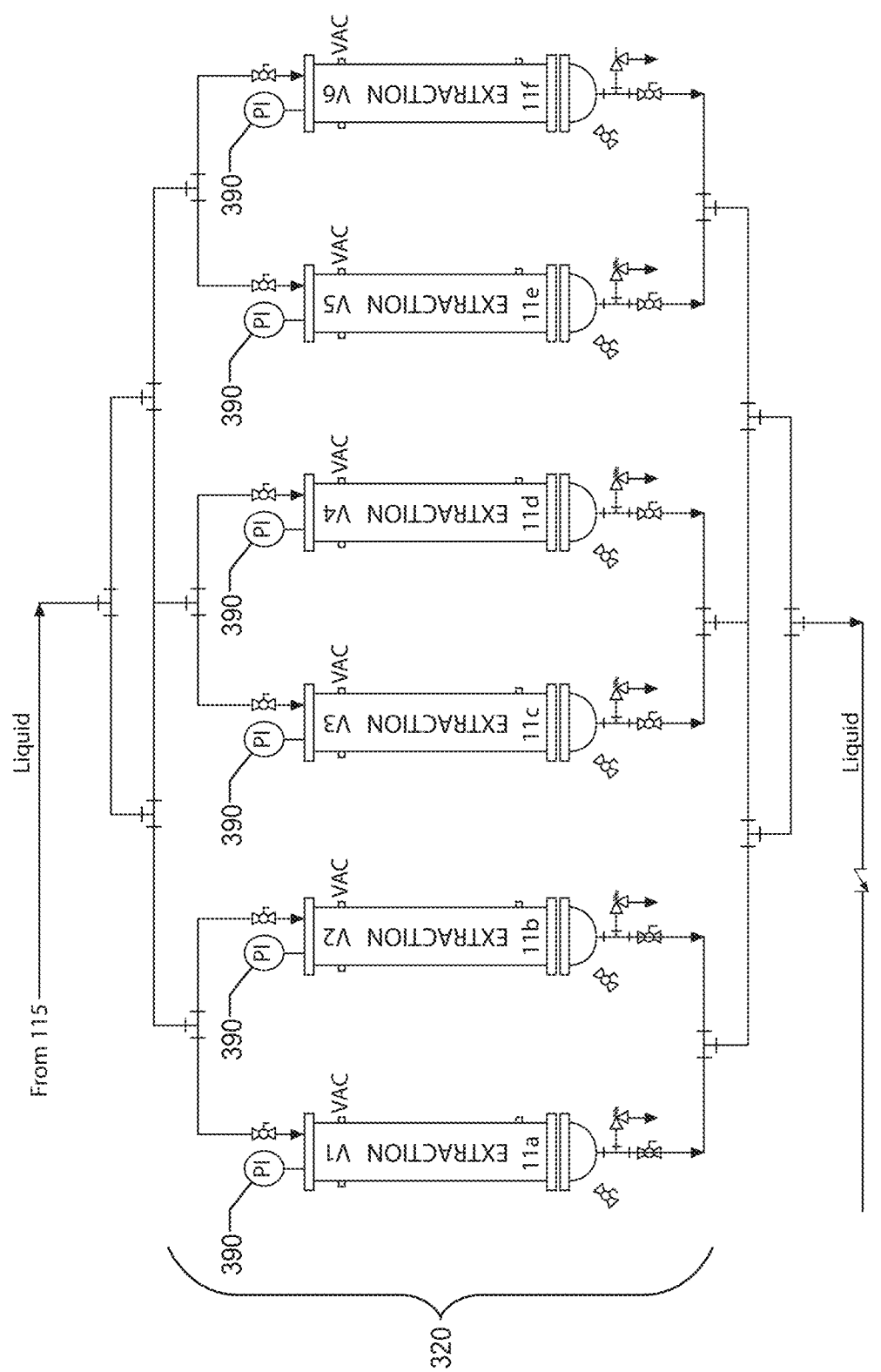

As shown in FIG. 3B, the extraction vessels 320 may be arranged in parallel and equipped with pressure gauges 390. The $CO_2$ extraction solvent enters the extraction vessels 320 from valve 115.

Figure 3C:
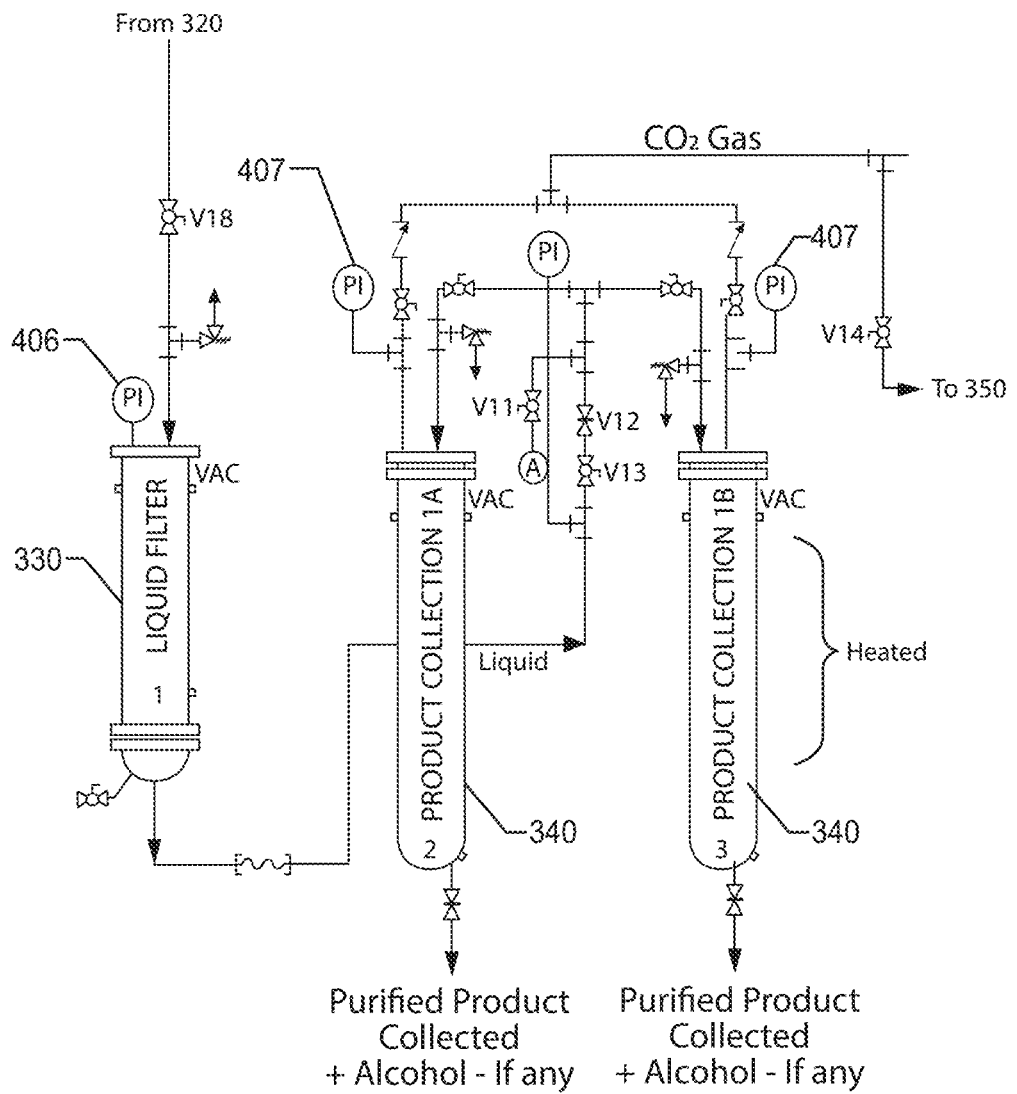

As shown in FIG. 3C, the miscella (extracted oil and liquid carbon dioxide solvent) arrive from the extraction vessels 320 and enter the liquid filter vessel 330 and collection vessels 340 may be equipped with pressure gauges 306. The flow of the miscella $CO_2$/oil mixture 145 into the liquid filter vessels 330 may be controlled by valve V18. Similarly, the flow of the filtered miscella $CO_2$/oil mixture as it leaves the liquid filter vessel 330 and passes into the collection vessels 340 may be regulated by valves V11, V12, and V13. The pressure gauges 406, 407, and 408 allow the user to monitor and regulate the pressure of the system for optimal collection of the finished product. FIG. 3C shows that the purified product and any alcohol co-solvents are collected and the carbon dioxide gas is sent to the condenser trap 350.

Figure 3D:
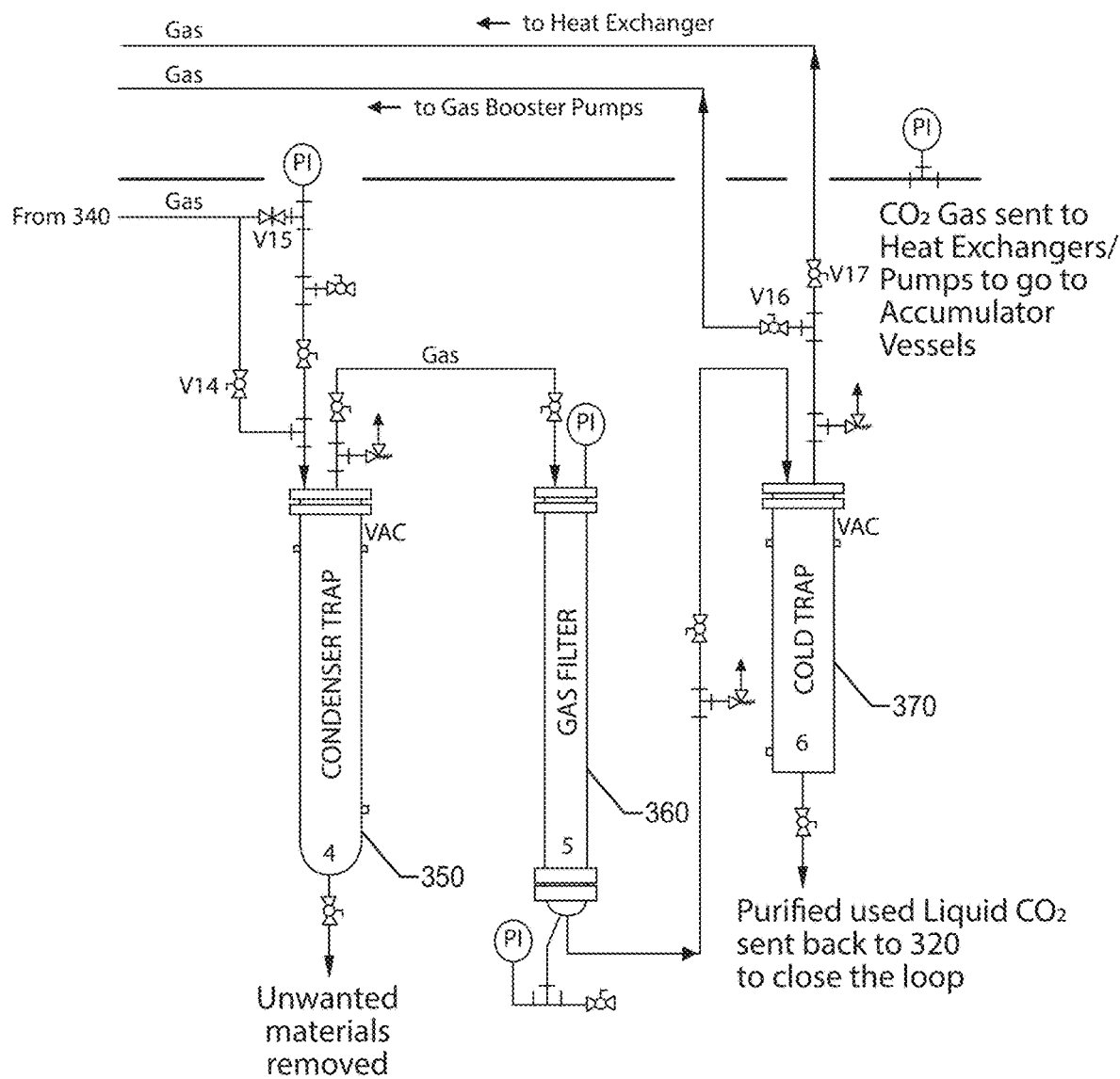

As shown in FIG. 3D, valves V14 and V15 may be used to regulate flow into the input end of the condenser trap 350, while valves V16 and V17 may be used to regulate the output flow of the cold trap 370. Generally, there may be three output lines for the cold trap, one, which is liquid carbon dioxide flows directly to the manual control panel in a closed loop, while the other two take the trapped gas and pass it to the heat exchanger or the gas booster pumps.

In normal operation, V16 is closed and V17 is open (this maybe referred to as the recirculating position) and it stays with way until completion of extraction. If or when the pressure goes to low and reaches 700 PSIG, V17 may be closed and V16 is opened.

Figure 3E:
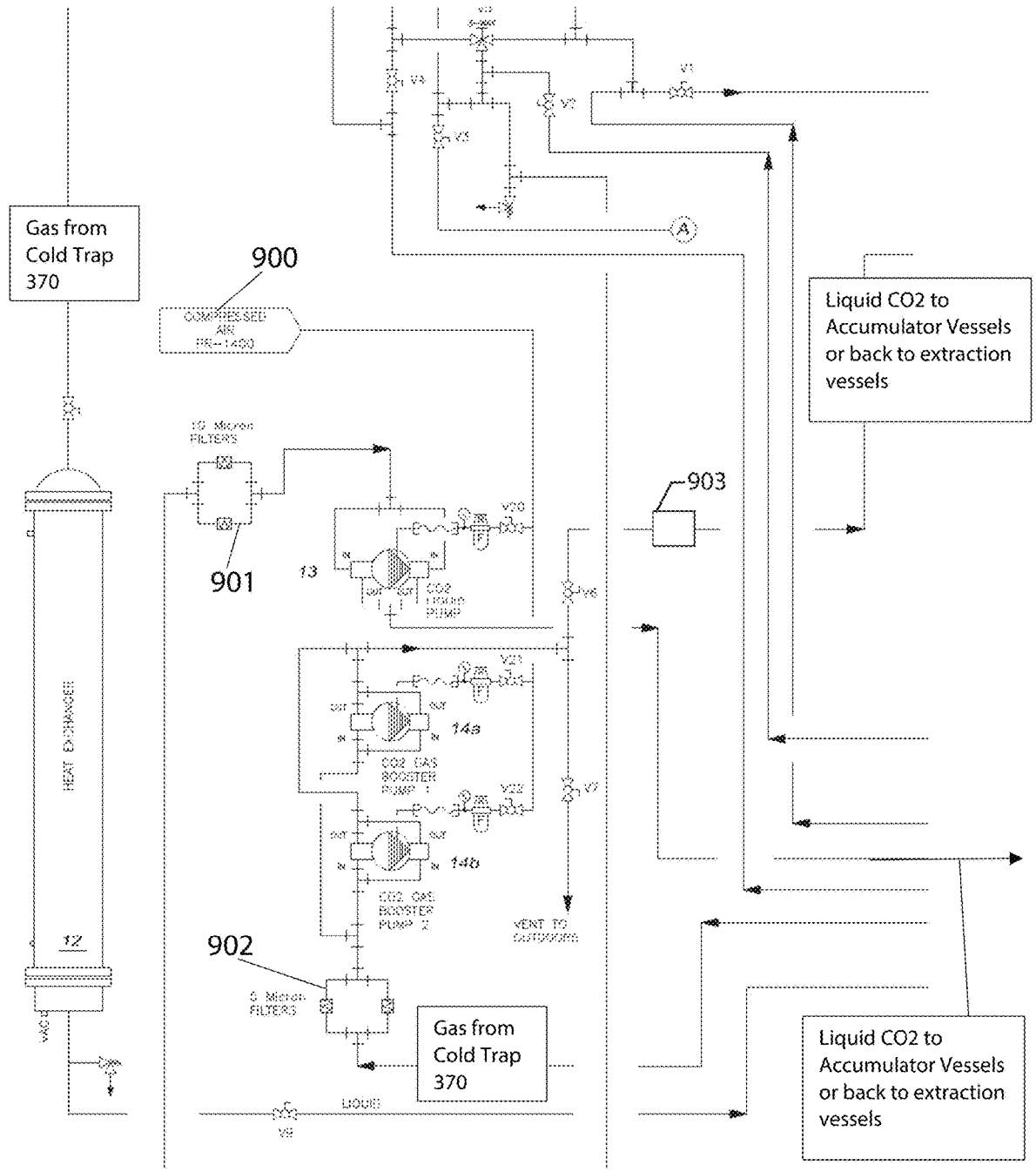

FIG. 3E shows the heat exchanger and booster pumps that are used to condense down the gaseous carbon dioxide to purified liquid carbon dioxide. The gas from the cold trap 370, during normal operation, may go to the heat exchanger 12, which lowers the temperature of the carbon dioxide and condenses it to a liquid. The liquid carbon dioxide may then be captured and sent to the filter 901 and into a compressed air 900 powered liquid carbon dioxide pump 13, which sends the liquid carbon dioxide to manual control panel 110 or to one of the two or more accumulator vessels. Alternatively, and typically if the pressure drops, the gaseous carbon dioxide may be sent to filter 902 and then on to one or more carbon dioxide gas booster pumps 14a, 14b, which are powered by compressed air 900. The carbon dioxide is then condensed in heat exchanger 903 and the now liquid carbon dioxide can then be sent to the manual control panel 110 or to one of the two or more accumulator vessels. The gas booster pumps can raise the pressure of the system to bring it back up to where it should be.

Figure 4A:
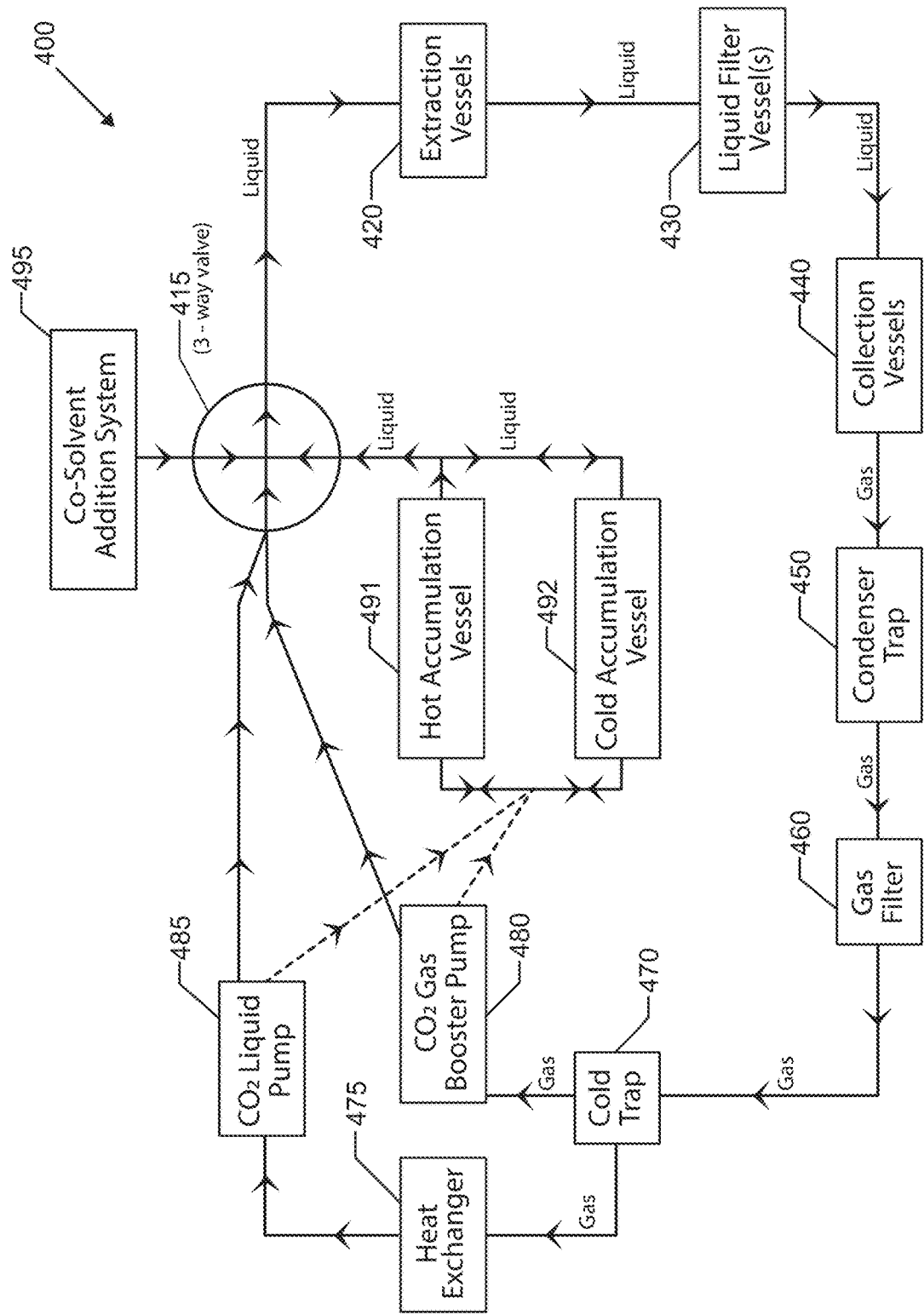
FIG. 4A is a flow schematic diagram showing one embodiment of a closed-loop liquid $CO_2$ extraction process.

FIG. 4 is a block diagram showing a closed-loop liquid $CO_2$ extraction process 400. As shown in FIG. 4, the liquid $CO_2$ extraction process 400 may be repeated multiple times in succession, by seamlessly recirculating, filtering, and collecting the solvent $CO_2$ used throughout. When an extraction cycle begins, liquid $CO_2$ may flow through an output port on the 3-way valve 415. The solvent $CO_2$ may then flow through extraction vessels 420, liquid filter vessel(s) 430, collection vessels 440, a condenser trap 450, and a gas filter 460. After passing through the gas filter 460, the $CO_2$ (now in gas form) reaches a cold trap 470. From the cold trap 470, the gaseous $CO_2$ may proceed along one of two pathways: either to a heat exchanger 475, or a $CO_2$ gas booster pump 480. If the pressure of the system is low, $CO_2$ may be sent from the cold trap 470 towards the $CO_2$ gas booster pumps 480, and then to a heat exchanger, after which the pressurized liquid carbon dioxide is either sent directly back into the loop or to the cold accumulation vessel 492. However, in normal operation, the gaseous $CO_2$ may instead be sent to the heat exchanger 475.

The gaseous $CO_2$ may be chilled and liquified in the heat exchanger 475, before continuing on to a $CO_2$ liquid pump 485, which pumps the liquid carbon dioxide into the closed loop system or into the cold accumulation vessel 492. If the extraction cycle is still ongoing, the liquid $CO_2$ may be sent to the 3-way valve 415, to be sent once again towards the extraction vessels 420. If, on the other hand, the extraction cycle is not being continued or immediately resumed, the reconstituted liquid $CO_2$ may flow from the $CO_2$ liquid pump 485 to a cold accumulation vessel 492. Similarly, $CO_2$ that reaches the $CO_2$ gas booster pump 480 may proceed to either the 3-way valve 415 or the cold accumulation vessel 492, depending on whether the extraction process is being continued or is being terminated. If extraction is to continue, reconstituted liquid $CO_2$ may flow from the $CO_2$ gas booster pump 480 to the 3-way valve 415. If extraction is to be paused or terminated, reconstituted liquid $CO_2$ may flow from the $CO_2$ gas booster pump 480 to the cold accumulation vessel 492. Another reason why the carbon dioxide may be diverted into the cold accumulation vessel 492 is that the pressure is too high in the closed loop system and extraction solvent needs to be removed to lower the pressure. In this manner, the cold accumulation vessel 492 may receive cold, reconstituted liquid $CO_2$ from either the $CO_2$ liquid pump 485 or the $CO_2$ gas booster pump 480.

One function of the cold accumulation vessel 492 is to act as a storage tank for recovered $CO_2$ after the completion of an extraction cycle. However, when used in conjunction with a hot accumulation vessel 491, reconstituted liquid $CO_2$ may be temporarily stored between the two accumulation vessels, to be re-released into the extraction system as additional solvent $CO_2$ is required for further extraction cycles. If the solvent level or closed loop pressure begins to drop too low throughout the main extraction lines, solvent and pressure may be added by sending solvent $CO_2$ from the hot accumulation vessel 491 (which is kept at high pressure) into the main extraction lines via, for example, the valve 415. If, however, solvent levels or pressure are too high in the main extraction lines, excess solvent may be diverted to the accumulation vessels as a means to safely reduce the excess pressure. While the hot accumulation vessel 491 and cold accumulation vessel 492 have been separately designated on FIG. 4, it is to be understood that either accumulation vessel may act as either a hot or cold accumulation vessel during the flow of liquid $CO_2$ between the two vessels. As shown in FIG. 5, either vessel may temporarily become hot or cold, or lower or higher in $CO_2$ levels, depending on the solvent and pressure requirements of the main extraction lines.

Additionally, the closed-loop liquid $CO_2$ extraction process 400 may additionally receive co-solvents from a co-solvent addition system 495. Controlled amounts of co-solvent, such as methane and/or ethanol, may be added to the extraction process 400 via an input port on, for example, the 3-way valve 415.

Figure 4B:
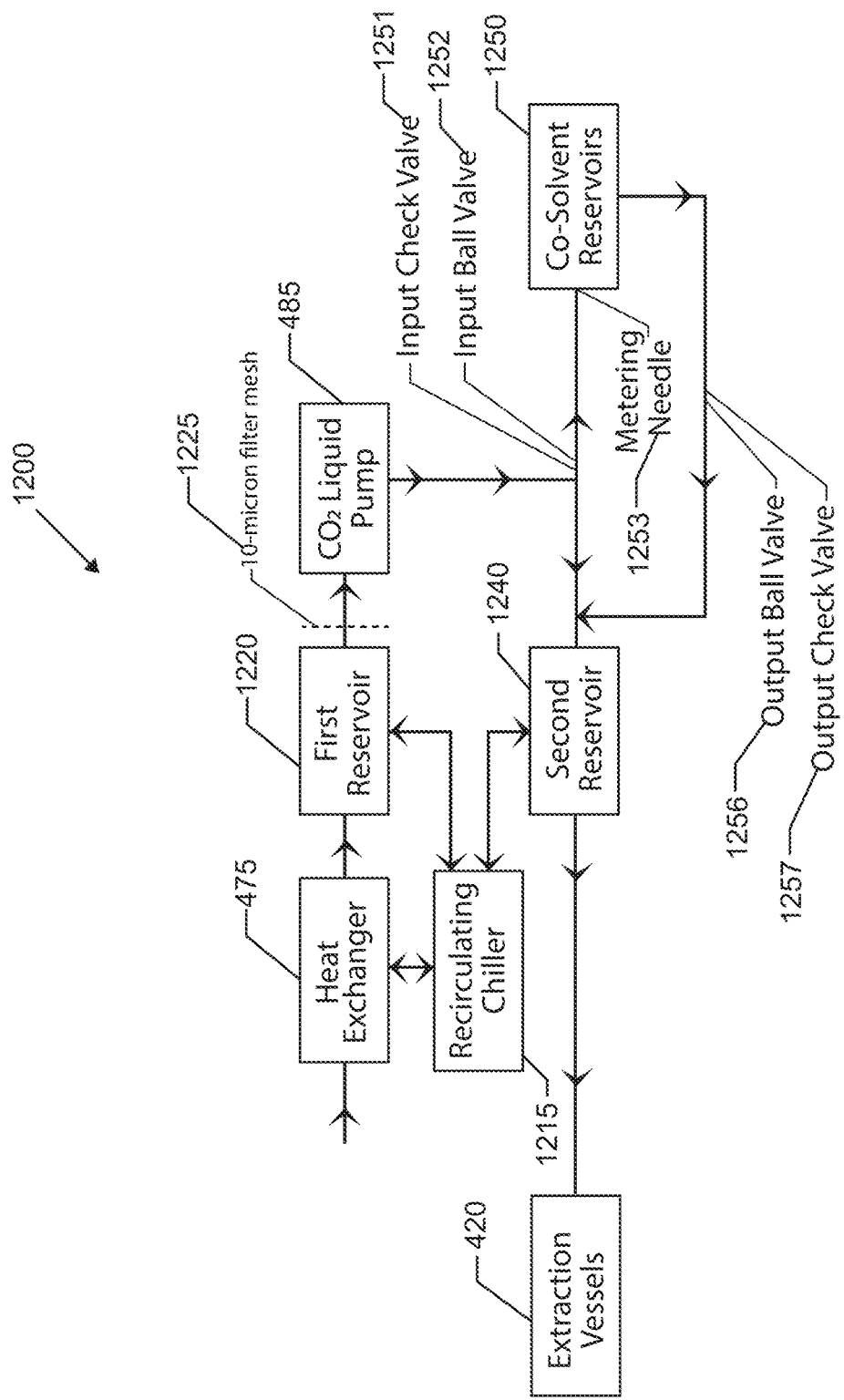
FIG. 4B is a flow schematic diagram showing one embodiment of a co-solvent addition process.
Figure 5:
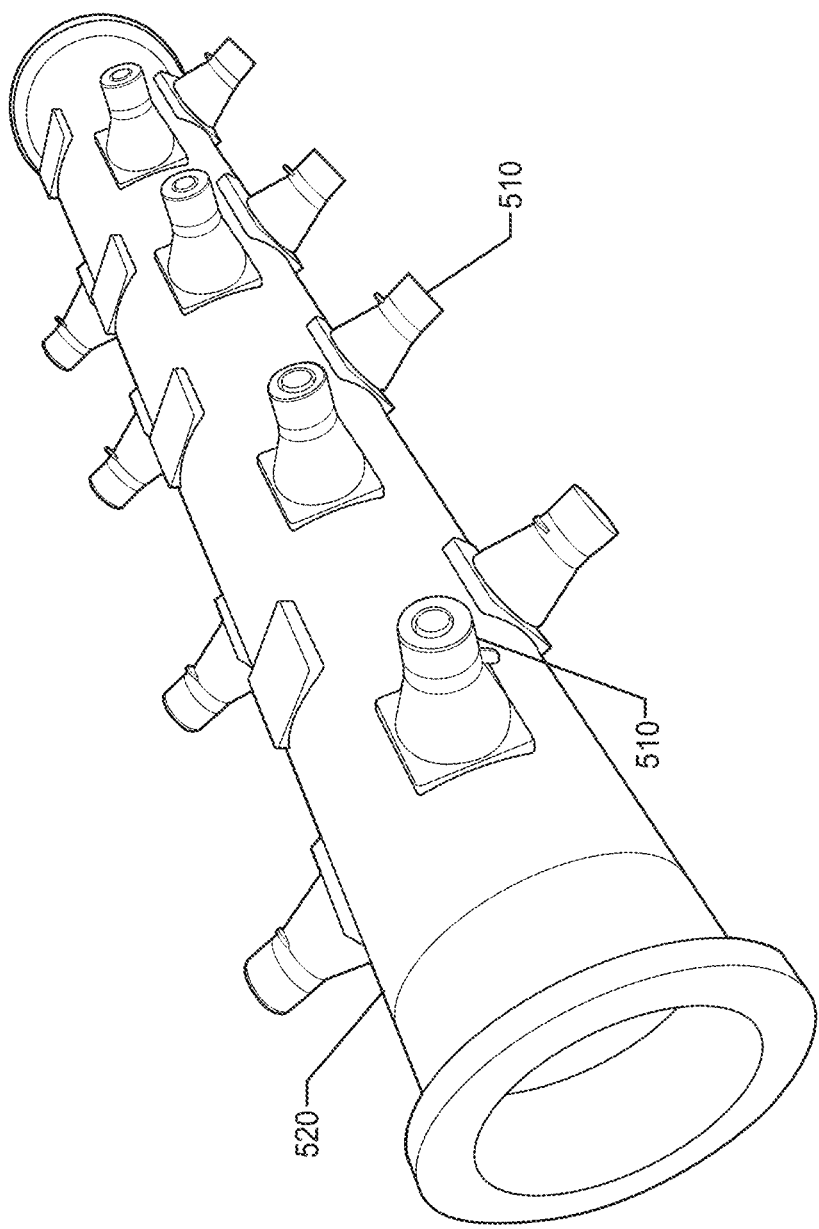
FIG. 5 is an illustration of one embodiment of an extraction vessel.

FIG. 4B is a flow schematic diagram showing one embodiment of a co-solvent addition process. As shown in FIG. 4B the liquid carbon dioxide from heat exchanger 475 may be sent to a first reservoir, which is chilled by recirculating chiller 1215, which may then pass the liquid carbon dioxide through filter 1225 and to liquid carbon dioxide pump 485. The liquid carbon dioxide may then go to second reservoir 1240, which is chilled, before it then goes to the extraction vessel 420. If the user wants to add a co-solvent to the liquid carbon dioxide, some of the liquid carbon dioxide may be diverted through valves 1251, 1252 and into co-solvent reservoir 1250, which may have metering needle 1253. The co-solvent may then mix with the carbon dioxide, through output check valve 1256 and ball valve 1257 and go to second reservoir 1240. This ensures an even mixing of the co-solvent with the liquid carbon dioxide that goes to the extraction vessels 420.

FIG. 5 is an illustration of one embodiment of an extraction vessel. As shown in FIG. 6, the extraction vessels 520 may be equipped with ultrasonic transducers 510, which may be connected or placed on the outside of the extraction vessels 520. The ultrasonic transducers 510 improve extraction efficiency, by applying high-frequency sound waves to the plant matter and the liquid $CO_2$ extract solvent during extraction, facilitating greater mixing and dissolving between the plant matter and the liquid $CO_2$. In one embodiment, the ultrasonic transducers 510 may have a power of approximately 60-100 W, each emitting a frequency between approximately 20-50 kHz. Preferably, the ultrasonic transducers 510 may be placed on the outside of the extraction vessels 520 with a placement density of one transducer per 100 $cm^2$.

FIG. 6 is an illustration of one embodiment of the accumulator vessels. As shown in FIG. 6, the storage tanks and recovery vessels may be two or more vessels, such as accumulator vessels 605, 705, which may work in tandem to store and collect the liquid carbon dioxide that is not currently being used as part of the closed loop extraction chain. Preferably, the accumulators 605, 705 are identical, such that either one can be used for the purposes of supplying the carbon dioxide to the system 620, 720 or receiving carbon dioxide out of the system 610, 710. Accumulator vessels 605, 705 may contain the stored liquid carbon dioxide that is used in the extraction process. Preferably, there are two accumulator vessels 605, 705 as there are, generally, two situations related to the use of the carbon dioxide. The first one may fill the extraction system with liquid carbon dioxide to be able to perform the extraction and the second may be for the recovery of the carbon dioxide out of the system for storage and later use. The accumulator vessels 605, 705 may be able to be heated or chilled, which enables a change in pressure of the accumulator vessels 605, 705. The accumulator vessels 605, 705 may have level sensors 606, 706. Preferably, one of the accumulator vessels may be high pressure (greater than 1000 PSIG) and high temperature (approximately 175 degrees F.) and the other is low pressure (less than 600 PSIG) and low temperature (approximately 0 degrees Celsius). These accumulators are how the system stores and introduces liquid carbon dioxide into the system. The accumulators 605, 705 may be paired and the system can draw from the vessel that is heated and thus at a high psi and also pump into the other accumulator that is chilled and at a lower psi. The change in pressure is imparted by heating of chilling the jacket of the vessel. Preferably, the top one third of the vessels are jacketed and can either by chilled or heated, and the bottom two thirds of the vessel may be kept chilled. There is a level sensor 606, 706 within the vessels 605, 705 to indicate the amount of liquid carbon dioxide contained within. The output of the high pressure carbon dioxide goes either into the extraction vessels themselves or to the liquid carbon dioxide pump while the all chilled vessel receives carbon dioxide either from a liquid carbon dioxide pump or a gas booster carbon dioxide pump.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A carbon dioxide extraction apparatus, comprising:
   one or more extraction vessels;
   one or more filter vessels;
   one or more co-solvent reservoirs;
   one or more carbon dioxide reservoirs;
   one or more liquid carbon dioxide accumulator vessels;
   one or more adsorbent materials; and
   one or more collection vessels, wherein each of said one or more collection vessels comprises a heating jacket, which are configured to heat said one or more collection vessels;
   wherein said one or more extraction vessels are configured to receive plant-based materials and a carbon dioxide extraction solvent, which comprises carbon dioxide and one or more co-solvents;
   wherein said one or more co-solvent reservoirs are configured to store one or more co-solvents before they are added to said carbon dioxide to create said carbon dioxide extraction solvent;
   wherein said one or more carbon dioxide reservoirs are configured to store carbon dioxide before creation of said carbon dioxide extraction solvent;
   wherein said one or more extraction vessels are configured to allow said carbon dioxide extraction solvent, when in a liquid phase, to extract one or more crude oil compounds from said plant-based materials, such that a liquid carbon dioxide and miscella mixture is created;
   wherein said one or more filter vessels receive from said one or more extraction vessels said liquid carbon dioxide and miscella mixture;
   wherein said one or more filter vessels comprise said one or more adsorbent materials after are placed in-line;
   wherein said one or more filter vessels are configured to allow said liquid carbon dioxide and miscella mixture to pass through said one or more adsorbent materials;
   wherein said one or more collection vessels are configured to heat said liquid carbon dioxide and miscella mixture, such that said liquid carbon dioxide and miscella mixture is separated into a used gaseous carbon dioxide and a purified oil product;

wherein at least one of said one or more extraction vessels comprises one or more ultrasonic transducers;

wherein said one or more ultrasonic transducers are configured to apply a high-frequency sound wave to an exterior of said one or more extraction vessels;

one or more condenser traps, which are configured to separate one or more residual materials from said used gaseous carbon dioxide that is received from said one or more collection vessels by selectively condensing said one or more residual materials;

one or more gas filters, which are configured to remove one or more particulate impurities from said used gaseous carbon dioxide;

one or more heat exchangers;

one or more liquid carbon dioxide pumps;

wherein said one or more heat exchangers are configured to condense said used gaseous carbon dioxide into a recaptured liquid carbon dioxide;

wherein said one or more liquid carbon dioxide pumps are configured to send said recaptured liquid carbon dioxide to said one or more extraction vessels or to said one or more liquid carbon dioxide accumulator vessels; and wherein said one or more liquid carbon dioxide accumulator vessels are configured to be both cooled and heated on a top one third of said one or more liquid carbon dioxide vessels and configured to be only cooled on a bottom two thirds of said one or more liquid carbon dioxide accumulator vessels.

2. The apparatus of claim 1, wherein said one or more extraction vessels are configured to operate at temperatures less than 10 degrees Celsius and pressures greater than 900 PSIG.

3. The apparatus of claim 1, wherein said one or more filter vessels are configured to operate in temperatures less than 5 degrees Celsius.

4. The apparatus of claim 1, wherein said one or more collection vessels are configured to operate between 45 and 90 degrees Celsius.

5. The apparatus of claim 1, further comprising:
one or more booster heat exchangers; and
one or more carbon dioxide gas booster pumps;
wherein said one or more carbon dioxide gas booster pumps and said one or more booster heat exchangers are configured to condense said used gaseous carbon dioxide into a recaptured liquid carbon dioxide.

6. A carbon dioxide extraction apparatus for extracting cannabinoids from *Cannabis sativa*, comprising:
one or more extraction vessels;
one or more filter vessels;
one or more co-solvent reservoirs;
one or more carbon dioxide reservoirs;
one or more liquid carbon dioxide accumulator vessels;
one or more adsorbent materials; and
one or more collection vessels, wherein each of said one or more collection vessels comprises a heating jacket, which are configured to heat said one or more collection vessels;
wherein said one or more extraction vessels are configured to receive *Cannabis sativa* and a carbon dioxide extraction solvent, which comprises carbon dioxide and one or more co-solvents;
wherein said one or more co-solvent reservoirs are configured to store one or more co-solvents before they are added to said carbon dioxide to create said carbon dioxide extraction solvent;

wherein said one or more carbon dioxide reservoirs are configured to store carbon dioxide before creation of said carbon dioxide extraction solvent;

wherein said one or more extraction vessels are configured to allow said carbon dioxide extraction solvent, when in a liquid phase and mixed with said *Cannabis sativa* within said one or more extraction vessels, to extract one or more crude oil compounds from said *Cannabis sativa*, such that a miscella is created that comprises said carbon dioxide extraction solvent and said one or more crude oil compounds;

wherein said one or more crude oil compounds comprises one or more cannabinoids;

wherein said one or more filter vessels receive from said one or more extraction vessels said miscella;

wherein said one or more filter vessels comprise said one or more adsorbent materials, and are placed in-line;

wherein said one or more filter vessels are configured to allow said miscella to pass through said one or more adsorbent materials and be collected in said one or more collection vessels, such that one or more impurities are removed from said one or more crude oil compounds, forming a filtered miscella;

wherein said one or more collection vessels are configured to heat said filtered miscella, such that said filtered miscella is separated into a used gaseous carbon dioxide and a purified oil product;

wherein at least one of said one or more extraction vessels comprises one or more ultrasonic transducers, which are located on an exterior of said one or more extraction vessels; and wherein said one or more liquid carbon dioxide accumulator vessels are configured to be both cooled and heated on a top one third of said one or more liquid carbon dioxide accumulator vessels and configured to be only cooled on a bottom two thirds of said one or more liquid carbon dioxide accumulator vessels.

7. The apparatus of claim 6, wherein said one or more ultrasonic transducers are configured to apply high-frequency sound waves-to said exterior of said one or more extraction vessels;

wherein said one or more extraction vessels are configured to operate in temperatures less than 10 degrees Celsius and at pressures greater than 900 PSIG;

wherein said one or more filter vessels are configured to operate at temperatures less than 5 degrees Celsius; and wherein said one or more collection vessels are configured to operate between 45 and 90 degrees Celsius.

8. The apparatus of claim 7, further comprising:
one or more heat exchangers; and
one or more liquid carbon dioxide pumps;
wherein said one or more heat exchangers are configured to condense said used gaseous carbon dioxide into a recaptured liquid carbon dioxide;
wherein said one or more liquid carbon dioxide pumps are configured to send said recaptured liquid carbon dioxide to said one or more extraction vessels or to said one or more liquid carbon dioxide accumulator vessels.

9. The apparatus of claim 8, further comprising:
one or more booster heat exchangers; and
one or more carbon dioxide gas booster pumps.

* * * * *